MAGNETIC DEVICE FOR STORING ANALOG INFORMATION

Filed May 28, 1965

INVENTOR
RICHARD C. WOODBURY
BY Samuel Lindenberg
Arthur Freilich
ATTORNEYS

June 30, 1970 R. C. WOODBURY 3,518,637

MAGNETIC DEVICE FOR STORING ANALOG INFORMATION

Filed May 28, 1965 2 Sheets-Sheet 2

INVENTOR
RICHARD C. WOODBURY
BY Samuel Lindenberg
Arthur Friedrich
ATTORNEYS

United States Patent Office 3,518,637
Patented June 30, 1970

3,518,637

MAGNETIC DEVICE FOR STORING ANALOG INFORMATION

Richard C. Woodbury, Stanford, Calif., assignor to Research Corporation, New York, N.Y., a non-profit corporation of New York Filed May 28, 1965, Ser. No. 459,797
Int. Cl. G11c *27/00, 11/06, 7/00*
U.S. Cl. 340—174 9 Claims

ABSTRACT OF THE DISCLOSURE

A magnetic device capable of storing analog information and being nondestructively read. The device consists of a conductive magnetic medium, e.g. a length of tape, having a preferred axis of magnetization. The medium will have a remanent state characterized by a net magnetization in either of two opposite directions along the preferred axis which net magnetization can have a magnitude anywhere between zero and saturation. By setting up a drive current in the medium which flows along the preferred axis, a resulting magnetizing force perpendicular to the preferred axis will be developed which tends to otate the magnetic vector from the preferred axis. Consequently, there will be a change in magnetic flux along the preferred axis which change can be recognized by a sense winding. The amount and direction of flux change along the preferred axis is respectively related to the magnitude and directions of the remanent state.

This invention relates generally to magnetic storage devices and more particularly to devices capable of storing analog information.

U.S. patent application Ser. No. 257,203 filed Feb. 8, 1963, by Harold S. Crafts, now U.S. Pat. 3,276,001 discloses several magnetic core analog storage cell embodiments each of which is capable of being nondestructively read. Each of the cells disclosed in the cited application has magnetic means therein which can define a zero flux state and remanent flux states on either side of the zero flux state. A pair of windings are coupled to the magnetic means and when an alternating current drive signal is applied to one of the windings, a selected direct current signal applied to the other winding can change the remanent state of the magnetic means to a desired magnitude and direction. In the absence of the alternating current signal, which reduces the apparent coercive force of the magnetic means, the direct current signal is insufficient to change the remanent state. Thus, the disclosed cells can be used in coincident current type arrays as is explained in greater detail in WESCON Convention Report No. 6.2 (1963) entitled "Design of a Magnetic Variable-Gain Component for Adaptive Networks" by H. S. Crafts. Nondestructive readout is accomplished by applying the alternating current drive signal to one of the windings and sensing the output of the second harmonic of that signal at the other winding. The phase and amplitude of the second harmonic are respectively representative of the flux direction and magnitude in the remanent state.

The present invention is directed to an improved analog storage device of the above-described type. That is, it is an object of the present invention to provide an improved analog storage device which can be read nondestructively and which can be provided at a relatively low cost.

It is an additional object of the present invention to provide an analog storage device whose remanent state can be altered only in response to the application of first and second signals thereby making it suitable for use in a coincident current array.

Briefly, in accordance with the present invention, a conductive magnetic medium, e.g. a length of tape, having a preferred axis of magnetization is utilized for storage. The medium can have a remanent state characterized by a net magnetization in either of two opposite directions along the preferred axis which net magnetization can have a magnitude anywhere between zero and saturation. By setting up a drive current in the medium which flows along the preferred axis, a resulting magnetizing force perpendicular to the preferred axis will be developed which tends to rotate the magnetic vector from the preferred axis. Consequently, there will be a change in magnetic flux along the preferred axis which can be recognized by a sense winding. The amount and direction of change of flux along the preferred axis is respectively related to the magnitude and direction of the remanent state.

In a preferred embodiment of the invention, first and second lengths of conductive tape, each of square loop magnetic material, are provided with one being placed on top of the other. The tapes are similarly oriented. A plurality of spaced magnetic spacers are placed between the tapes to thus define a plurality of closed magnetic paths or cells along the preferred axis. A different sense winding is coupled to each such cell and functions to sense the change in flux along the preferred axis in response to a drive current applied directly to the tapes and flowing along the preferred axis.

In an alternate embodiment of the invention, each cell is defined by a toroidal core formed of conductive tape of magnetic material. The core is coupled to a transformer core and a drive current is established therein by transformer action. A sense winding coupled to the core functions in substantially the same manner as in the preferred embodiment.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
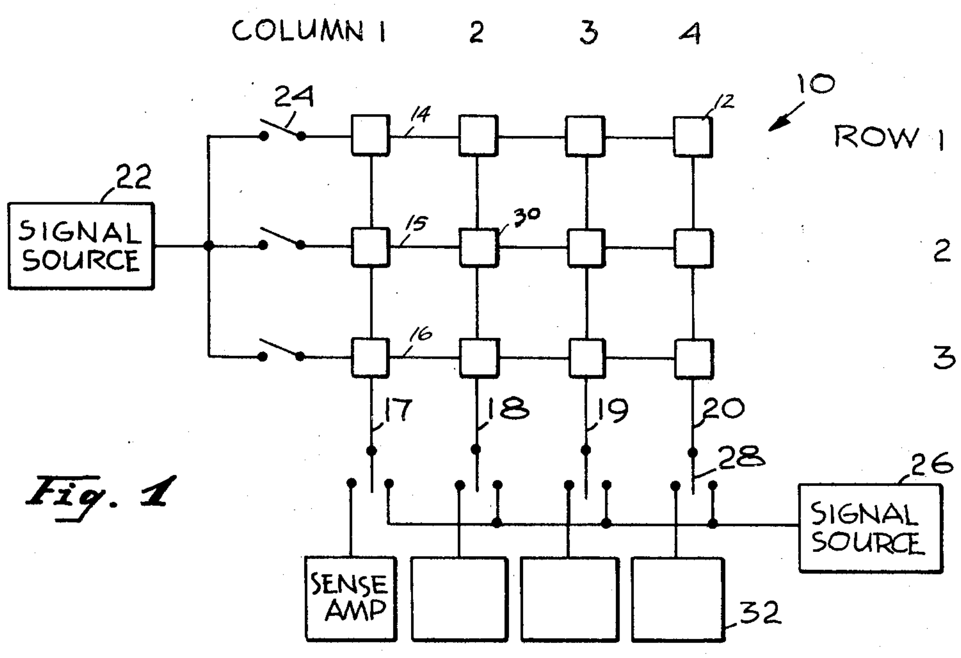
FIG. 1 is a block diagram illustrating a coincident current type array in which embodiments in accordance with the present invention can be employed.

Attention is now called to FIG. 1 which illustrates a system in which embodiments of the invention find significant utility. More particularly, FIG. 1 illustrates a rectangular matrix 10 comprised of a plurality of magnetic analog storage devices 12 arranged in rows and columns. In the exemplary apparatus illustrated, the matrix 10 is comprised of three rows and four columns but it should of course be appreciated that any number of rows and columns could be employed. In such matrices, a different conductor is associated with all of the devices 12 of a particular row. Thus, conductors 14, 15, and 16 are respectively coupled to all of the elements of rows 1, 2, and 3 of the matrix. Similarly, a different conductor is coupled to all of the devices 12 of each one of the matrix rows. Thus, conductors 17, 18, 19, and 20 are respectively coupled to the devices of columns 1, 2, 3, and 4.

Analog information can be written into a selected one of the devices 12 by applying signals to both of the conductors to which the selected device is coupled. Each of the conductors 14, 15, and 16 is coupled to a first signal source 22 through a switch 24. Each of the conductors 17, 18, 19, and 20 is connected to a second signal source 26 through a single pole double throw switch 28. In order to write information into a selected device, e.g. device 30, it is necessary to apply signals to conductors 15 and 18 and this of course is done by respectively coupling these conductors through switches 24 and 28 to the signal sources 22 and 26. The other devices 12 coupled to conductor 15 and conductor 18 will not be affected inasmuch as the signals provided by the sources 22 and 26, taken alone are insufficient, as will be better understood hereafter, to alter the storage of a device.

In order to read information from any one of the devices 12, the row conductor to which it is coupled is energized by signal source 22 by closing the switch 24 coupled thereto. All of the devices 12 coupled to the energized row conductor, will provide output signals on the column conductors to which they are coupled. The output signals appearing on the column conductors will be indicative of the storage content of the interrogated storage devices. A different sense amplifier 32 is provided for each of the column conductors and can be connected thereto through switch 28. As previously noted, the aforecited patent application and article by Mr. H. S. Crafts describes devices 12 suitable for use in the system of FIG. 1. The present invention is directed to alternative storage devices as illustrated in FIGS. 2 through 5.

Figure 2:
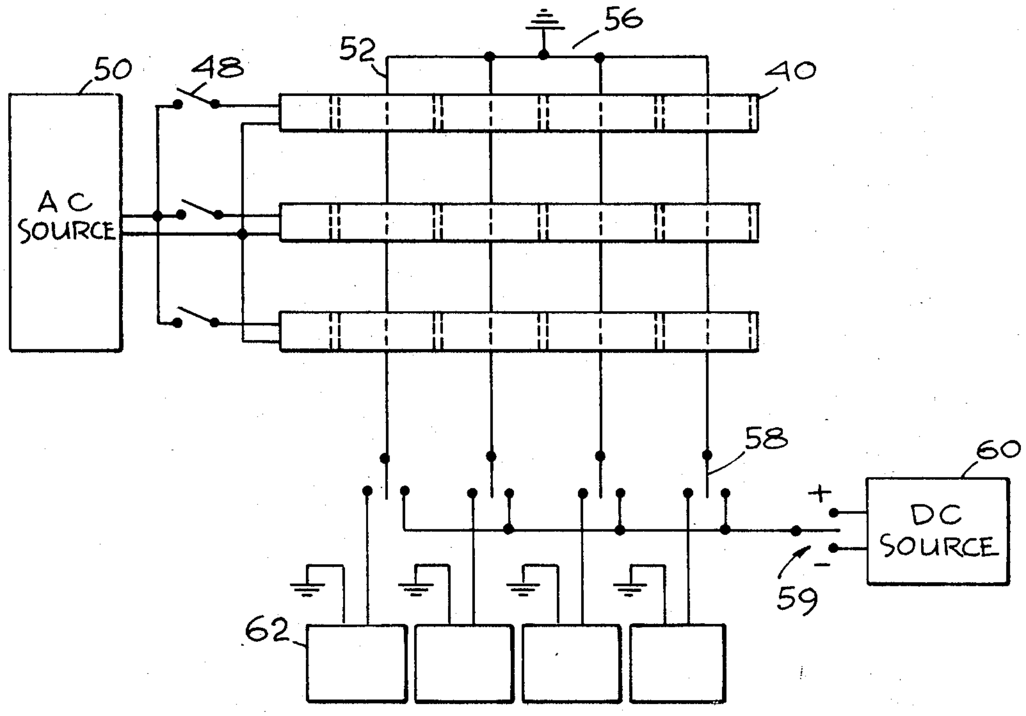
FIG. 2 is a plan view of a plurality of storage cells constructed in accordance with the invention, also illustrating in block form other components which can be used therewith.
Figure 3:
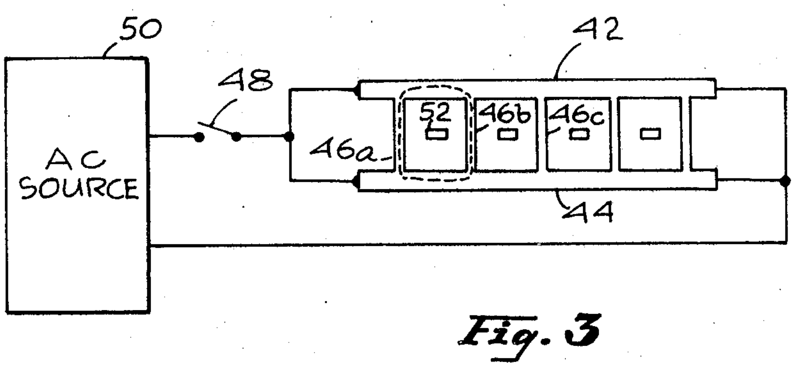
FIG. 3 is a side sectional view illustrating the structural detail of a plurality of memory cells constructed in accordance with the present invention.

More particularly, attention is now called to FIGS. 2 and 3 which illustrates a preferred embodiment of the present invention. The storage devices of FIGS. 2 and 3 are formed by providing first and second conductive tapes 42, 44, formed of square loop magnetic material which can comprise grain oriented nickel iron alloy tape. The tapes 42, 44 should be similarly oriented and should have a preferred axis of magnetization preferably directed along their length. As is best shown in FIGURE 3, the tapes 42, 44 are placed on top of one another but spaced from one another by a plurality of spaced magnetic spacers 46. Each of the spacers 46 is magnetically coupled to both tapes 42 and 44. Adjacent spacers 46, together with those parts of the tapes 42 and 44 therebetween, together define a closed magnetic path. Thus, spacers **46*a* and 46*b*, together with the parts of tapes 42 and 44 between the spacers form one storage device. Similarly, a second storage device or cell is formed between the spacers 46*b* and 46*c***.

The tapes 42 and 44 are connected in parallel and form part of a current path extending through switch 48 from the output terminals of an alternating current source 50.

A sense winding 52 is threaded through each of the storage cells, that is between the spacers 46 and tapes 42 and 44 defining the cell. Thus, a pair of tapes 42, 44 with magnetic spacers 46 therebetween can define a plurality of cells corresponding to a row of devices as shown in FIG. 1. Each sense winding may be threaded through correspondingly positioned cells in each of the rows of the matrix of FIG. 2 as illustrated. One terminal of each of the sense windings can be connected to ground 56 while the second terminal thereof can be connected to a single pole double throw switch 58. In a first position, the switch connects the sense winding to a switch 59 on the direct current source 60 and in a second position, the switch 58 connects the sense winding 52 to a sense amplifier 62. A different sense amplifier is preferably provided for each of the sense windings 52.

As previously noted, the tape 40 has a preferred axis of magnetization. Thus, the tape can be magnetized in first and second directions along this axis and the magintude of magnetization or flux can be selectively establish anywhere between a zero flux level and a saturation flux level. In order to alter the state of remanence of a particular cell in a first direction, the switch 48 is closed which couples the tape 40 of which the cell is a part, to the alternating current source 50. Then, a direct current in the direction desired, as determined by switch 59, is provided in the appropriate sense winding 52 by closing a selected switch 58. The direction of current through the sense winding 52 will of course determine the direction of the change of net magnetization of the cell. The magnitude of current provided by the source 60 is chosen to be insufficient by itself to change the remanent state of any of the cells. It is only when the direct current is applied to a cell by the sense winding 52 in conjunction with an alternating current applied to that same cell by the source 50, that the remanent state of the cell can be modified. This is so because the alternating current considerably reduces the apparent coercive force of the cell. The level of the alternating current defines a direct current threshold for the cell. Thus, for a particular alternating current level, it is essential that the magnitude of current provided by the source 60 be between the apparent threshold value, existing when alternating current flows, and the threshold value existing when no alternating current flows.

It is pointed out that the time rate of change of the remanent flux with respect to the direct current from source 60 is quite constant and reversible thus enabling the remanent flux of each of the cells to be varied rather smoothly. Although a single direct current source 60 is illustrated for all of the sense windings and no particular means are shown for controlling the time duration of the direct current signal, it should be appreciated that in an actual system, the amplitude and/or duration of the direct current signal applied to a sense winding will be controlled in accordance with the analog data to be stored.

Figure 4:
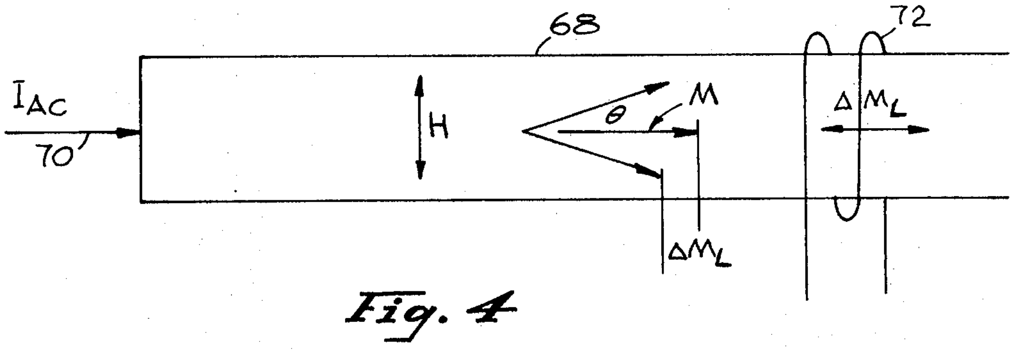
FIG. 4 is a diagrammatic illustration tending to show the operation of a cell constructed in accordance with the present invention.
Figure 5:
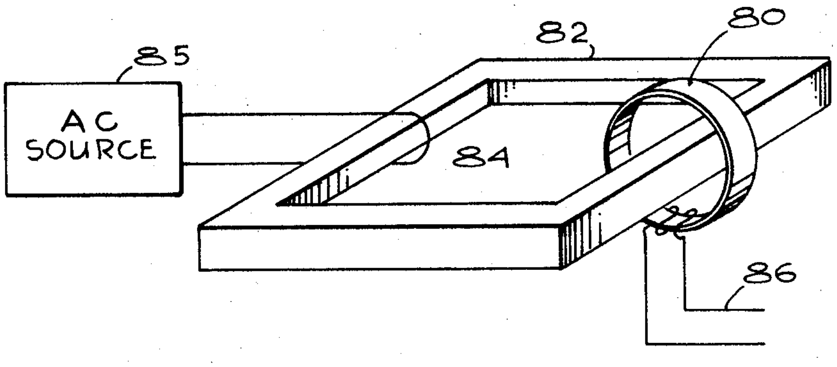
FIG. 5 is a perspective view of an alternate embodiment of the invention.

In order to understand the manner in which a cell can be nondestructively read, attention is called to FIG. 4. Let the vector M represent the flux magnitude and direction for the established remanent state. The direction of the vector M is of course along the preferred axis of magnetization of the tape and is in either one of two opposite directions. In response to an alternating current signal applied to the tape, a fluctuating transverse magnetic field (represented by the vector H) will be developed which will rotate the vector M through an angle $\pm\theta$. As a consequence, the magnitude of the flux represented by the vector M along the preferred axis of magnetization will change at a rate proportional to the frequency of the applied alternating current. Moreover, the actual change in flux along the preferred axis will be related to the magnitude of the flux or in other words to the length of the vector M. Thus, by determining the value of the quantity $\Delta M_L$, that is the change in magnetization in the longitudinal direction along the preferred axis, the magnitude of vector M can be determined. The sense winding 72 in FIG. 4 is provided to sense the quantity $\Delta M_L$ and it should be appreciated that the change in flux along the preferred axis will induce a signal in the winding 72 whose magnitude is related to $\Delta M_L$ and consequently the vector M. It has been assumed that the magnitude and frequency of the applied alternating drive current remains constant. If either the frequency or the magnitude of the drive current is increased, the voltage induced in the sense winding will also be increased.

The signal induced in the sense winding 72 not only indicates the magnitude of the flux in the remanent state, but also indicates the direction of magnetization inasmuch as the phase of the signal induced in the winding 72 will be opposite for the two possible directions of magnization. It is further pointed out that the signal induced in the winding 72 will have a frequency equal to twice that of the applied drive current inasmuch as the length of the vector M along the preferred axis of magnetization will change for each half cycle of the applied drive current.

Thus, from what has been said with respect to FIGS. 2 through 4, it should be appreciated that a magnetic analog storage cell has been provided wherein analog data can be stored in a conductive tape formed of magnetic material and can be subsequently nondestructively read by driving an alternating drive current therethrough. In the embodiment of FIGS. 2 and 3, the alternating drive current is applied directly to the tape from an alternating current source. In an alternative embodiment of the invention illustrated in FIG. 5, a toroidal core 80 is formed of a conductive tape of magnetic material which can also comprise a nickel iron alloy. The core 80 is wound about and coupled to a linear transformer core 82. A primary winding 84 on the transformer core 82 is connected to a source 85 of alternating drive current. In operation, an alternating drive current will be induced in the toroidal core 80 via transformer action. Once the current is induced in the core 80, its operation will be similar to that already discussed with repect to the emobdiment of FIGS. 2 and 3. That is, in order to write, a direct current of appropriate amplitude and duration can be applied to sense winding 86 coupled to the core 80. In order to read, the signal induced in the winding 86 and available at its output terminals can be examined since its phase and amplitude will be indicative of the direction and magnitude of the core's remanent state.

Although only a single sense winding has been used in each cell both for reading and writing in the embodiments disclosed herein, it should be apparent that if desired in order to minimize switching problems, separate windings can be utilized for sensing the alternating current output signal during reading and applying the direct current input signal during writing.

What is claimed is:

1. A magnetic analog storage device comprising:
- an electrically conductive medium having a preferred axis of magnetization;
- means for establishing a remanent magnetization of selected magnitude between zero and saturation and selected direction along said preferred axis;
- means for driving a current through said medium along said preferred axis; and
- means for sensing the changes in magnetic flux magnitude along said preferred axis.

2. A magnetic analog storage device comprising:
- an electrically conductive magnetic tape forming at least part of a closed current path and defining at least one closed magnetic path, said current and magnetic paths being substantially parallel;
- means for establishing a remanent magnetic state along said magnetic path characterized by a selected flux direction and magnitude between zero and saturation;
- means for driving a current of predetermined frequency and amplitude along said current path to thereby develop an alternating magnetic flux component perpendicular to said magnetic path; and
- means for sensing flux changes in the direction of said path in response to said current.

3. The device of claim 2 wherein said tape is comprised of two electrically connected substantially spaced parallel portions; and
- first and second spaced magnetic spacers disposed between and coupled to said two portions.

4. The device of claim 2 wherein said tape is formed into a toroidal core; and including
- transformer means for inducing a current in said toroidal core.

5. The device of claim 2 including:
- first source means for coupling a signal to said tape sufficient to change said flux magnitude and direction in the presence of said current and insufficient to change said flux magnitude and direction in the absence of said current.

6. A magnetic cell capable of storing analog data which can be read nondestructively comprising:
- an electrically conductive tape having square loop magnetic properties forming at least part of a closed current path and defining at least one closed magnetic path, said current and magnetic paths being substantially parallel;
- means for establishing a remanent magnetic state along said magnetic path characterized by a selected flux magnitude and direction;
- means for driving an alternating drive current having a frequency $f_1$ along said current path; and
- means responsive to said drive current for providing an alternating current having a frequency $2f_1$ and phase and amplitude characteristics respectively related to said established flux direction and magnitude.

7. A magnetic cell capable of storing analog data which can be read nondestructively comprising:
- an electrically conductive magnetic tape forming at least part of a closed current path and defining at least one closed magnetic path, said current and magnetic paths being substantially parallel;
- said magnetic tape being comprised of two electrically connected spaced substantially parallel portions;
- first and second spaced magnetic spacers disposed between and coupled to said two portions;
- means for establishing a remanent magnetic state along said magnetic path characterized by a selected flux magnitude and direction;
- means for driving an alternating drive current having a frequency $f_1$ along said current path to thereby develop a magnetic flux component perpendicular to said magnetic path; and
- a sense winding threaded between said two tape portions and between said first and second spacers and responsive to changes in flux along said magnetic path for providing an alternating current output signal having a frequency $2f_1$ and phase and amplitude characteristics respectively related to said established flux direction and magnitude.

8. An apparatus defining a plurality of magnetic cells each capable of storing analog data and being read nondestructively, said apparatus comprising:
- an electrically conductive magnetic tape forming at least part of a closed current path and defining at least one closed magnetic path, said current and magnetic paths being substantially parallel;
- said magnetic tape being comprised of two electrically connected spaced substantially parallel portions;
- a series of spaced magnetic spacers disposed between and magnetically coupled to said two portions, each pair of adjacent spacers together with those parts of said tape portions therebetween defining a separate magnetic cell;
- means for establishing a remanent magnetic state in each of said magnetic cells, each of said states being characterized by a selected flux magnitude and direction along said magnetic path;
- means for driving an alternating drive current along said current path through said two tape portions for temporarily modifying the flux magnitude along said magnetic path established in each of said cells; and
- a plurality of sense windings, each threaded through a different one of said magnetic cells and each responsive to the flux therein being modified for providing an alternating output signal whose phase and amplitude are respectively related to the direction and magnitude of flux established in that cell.

9. The apparatus of claim 8 including means for selectively applying a signal to each of said sense windings sufficient to change the remanent state flux magnitude and direction characteristics of the cell coupled thereto in the presence of said drive current and insufficient to change said remanent state characteristics in the absence of said drive current.

References Cited

UNITED STATES PATENTS

| | | | |
|---|---|---|---|
| 3,164,814 | 1/1965 | Hebert | 340—174 |
| 3,173,132 | 3/1965 | Bobeck | 340—174 |
| 3,264,621 | 8/1966 | Gray | 340—174 |
| 3,276,000 | 9/1966 | Davis | 340—174 |
| 3,305,845 | 2/1967 | Grace et al. | 340—174 |
| 3,348,061 | 10/1967 | Oshima et al. | 340—174 |
| 3,371,327 | 2/1968 | Anderson et al. | 340—174 |

BERNARD KONICK, Primary Examiner

V. P. CANNEY, Assistant Examiner

U.S. Cl. X.R.

307—88